(No Model.) 2 Sheets—Sheet 1.
P. G. BACKMAN.
SAFETY DEVICE FOR ELEVATORS.
No. 401,106. Patented Apr. 9, 1889.
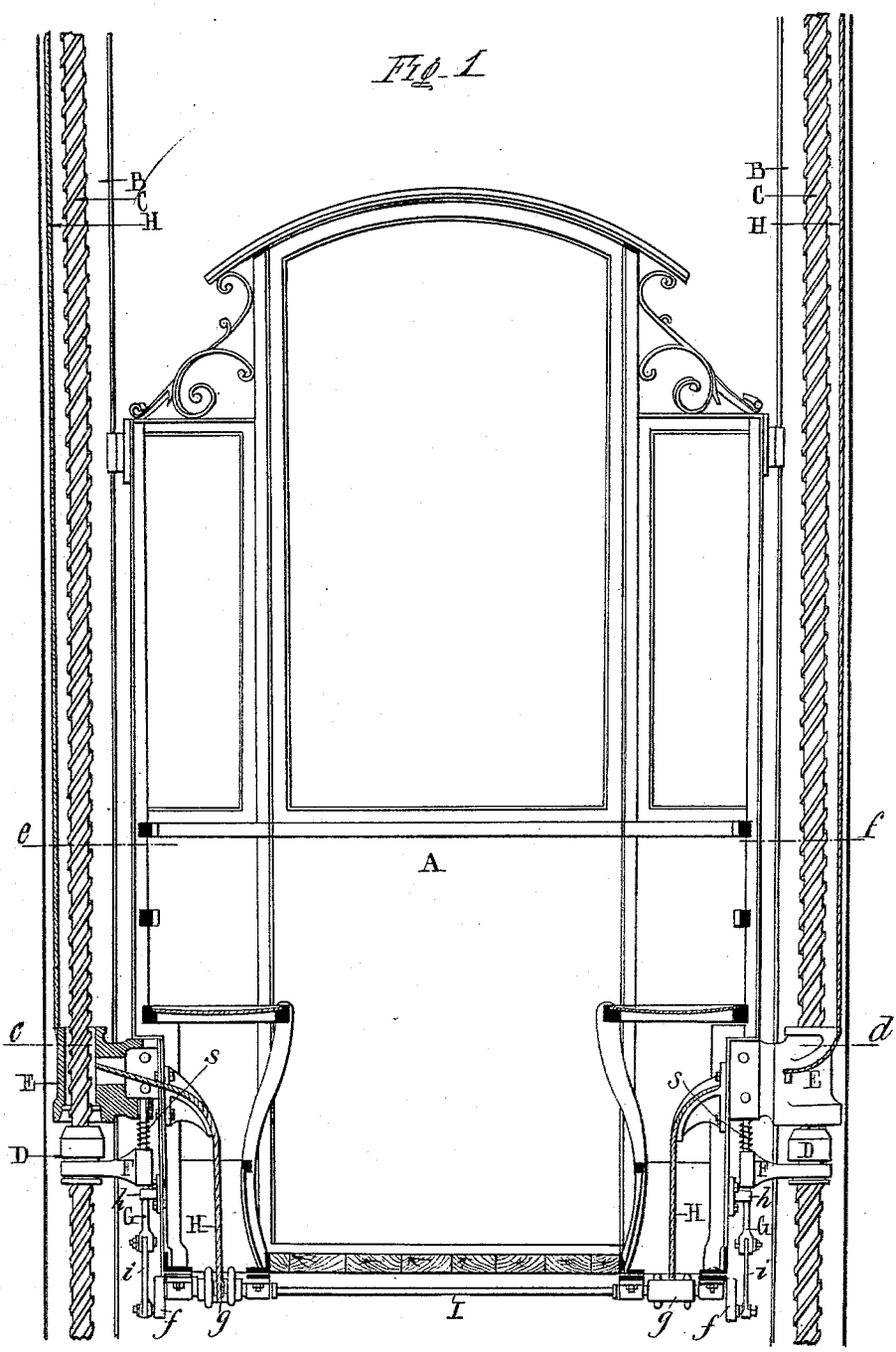
Witnesses:
Inventor:

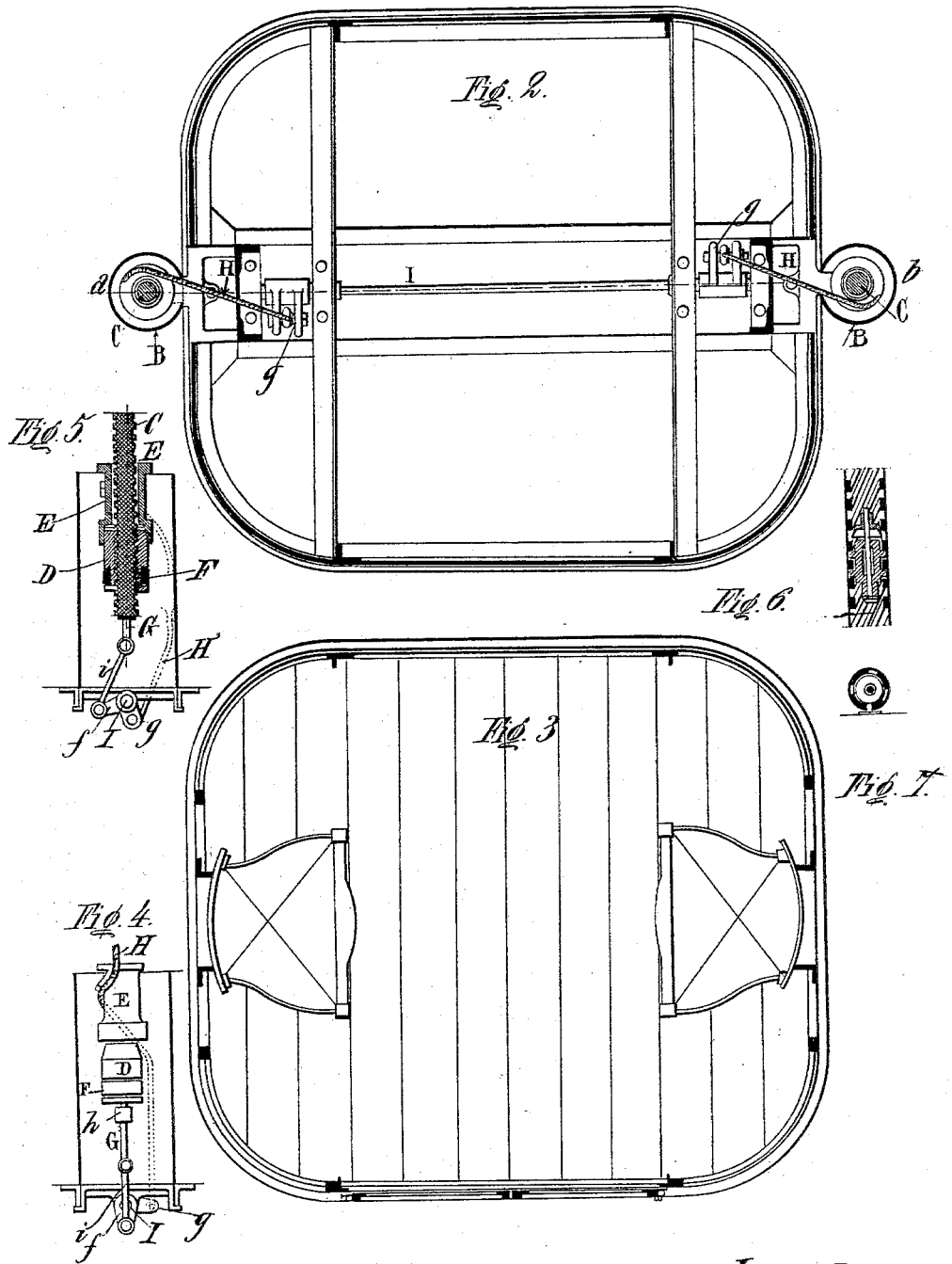

UNITED STATES PATENT OFFICE.

PER GUNNAR BACKMAN, OF PARIS, FRANCE.

SAFETY DEVICE FOR ELEVATORS.

SPECIFICATION forming part of Letters Patent No. 401,106, dated April 9, 1889.

Application filed February 14, 1889. Serial No. 299,903. (No model.) Patented in France May 18, 1888, No. 190,662.

*To all whom it may concern:*

Be it known that I, PER GUNNAR BACKMAN, a citizen of the Kingdom of Sweden, residing at Paris, in the Republic of France, have invented a new and useful Improvement in Safety-Stops for Elevators, (for which I have obtained a brevet d'invention in France, No. 190,662, dated May 18, 1888,) of which the following is a specification, reference being had to the accompanying drawings.

I will first describe the invention with reference to the drawings, and afterward point out its novelty in the claim.

Figure 1 represents a vertical section of an elevator-cab and its guides and an elevation of the safety-stop. Fig. 2 represents a horizontal section in the line $c\,d$ of Fig. 1. Fig. 3 represents a horizontal section in the line $e\,f$. Fig. 4 represents an elevation of the "brake," properly so called, in its normal condition. Fig. 5 represents an elevation, partly in section, of the brake in the position it assumes after the breakage of the hoisting-rope. Fig. 6 represents a vertical sectional view of a modification of the brake. Fig. 7 represents a horizontal section corresponding with Fig. 6.

Similar letters of reference designate corresponding parts in all the figures.

A is the cab, which is suspended and raised and lowered by two ropes, H H.

B B are vertical tubes which serve as guides for the cab.

C C are upright screws or screw-threaded rods arranged within the interior of the tubes B B. These screws or rods are of a length rather more than the upward and downward movement of the elevator.

D D are nuts fitted to turn upon the screws or rods C C, but carried by the cab and ascending and descending with it.

E E are sockets attached fixedly to the cab, and having their interiors large enough for the screw-threaded rods C C to pass freely through them without touching. The lower members of these sockets and the upper members of the nuts D D are of suitable form to constitute friction-brakes. In the example represented the upper members of the nuts are of conical form and the lower members of the sockets are bored conically to fit the conical portions of the nuts.

I is a horizontal shaft arranged in bearings attached to the cab. In the example represented these bearings are at the bottom of the cab. Upon this shaft are keyed two cranks, $ff$, and two lever-arms, $g\,g$. One of the latter is set on the right-hand side and the other on the left-hand side of the shaft I, as shown in Fig. 2, and the two suspension-ropes are attached to their extremities.

G G are rods which work in guides $h$, attached to the cab one on each side, and which are connected by rods $i$ with the lever-arms $g\,g$, so that by a rotation of the shaft I said rods G G may be raised and lowered. Attached to each of these rods is an arm, F, which supports one of the nuts D in such manner as to leave the latter free to turn on the screw-threaded rods, but to cause the latter to take part in the ascensional movement of the cab, but to prevent it during the descent from descending more rapidly than the cab.

The inclination of the threads of the screw-threaded rods C C is sufficiently great to enable the nuts to move upon them by their own weight or by the pressure exercised upon them by the arms F, the nuts accompanying the cab in its ascending and descending movement without producing any very great friction, by reason of a considerable play being provided between them and the lower parts of the sockets E, which combine with them to form brakes. In order to prevent any accidental binding between the parts of the nuts D and sockets E, which constitute the brakes, light springs $s$ are applied between the arms F and the said sockets; but these springs may not be necessary.

The brake is based upon the principle that a breakage of the rope will have the effect of bringing together its members which are formed upon the socket E and the nut D, respectively, and that this bringing of them together will produce friction or resistance sufficient to prevent the rotation of the nut. It follows that the cab will remain suspended upon the screw-threaded rods through the intermediation of the nuts, the surfaces of contact of the nuts and sockets being of such character that the friction developed between them by the contact is sufficient to produce this effect.

The stoppage of the cab results then from a difference of acceleration between it and the nuts—a difference which arises from a breakage either of the cable or the pieces by which it sustains the cab.

The shaft I preserves always the same position as long as the two ropes have the same length; but if one of them is stretched or broken, the equilibrium of the shaft being destroyed, it turns about its axis, and by means of the arms $g\,g$, set in opposite directions, and the cranks $f\,f$, raises the two rods G G and the arms F and the nuts. It follows therefrom that the upper parts of the nuts D D and the lower parts of the sockets E E come in contact and act as brakes to prevent the turning of the nuts and their descent on the screw-threads.

The screw-threaded rods C C may be of any suitable material, either in a single piece or of several bars twisted together about a common axis. A metal cable might also be employed in place of these rods, the nuts D in such case having a pitch corresponding to the twist of the cable. The screw-threaded rods or cables may serve as guides to the cab, in which case the tubes B might be dispensed with.

It is evident that the principle of the brake is the same if the screw-threaded rods or cables are dispensed with and the nut moves upon screw-threads arranged in the interior of two tubes, as shown in the modification, Figs. 6 and 7, or upon two racks which would simply be longitudinal sections of such tubes. The screw-threaded tubes shown in the last-mentioned figures or the two racks above mentioned are the equivalent of the screw-threaded rods shown in Figs. 1, 2, 4, and 5.

What I claim as my invention, and desire to secure by Letters Patent, is—

The combination, with an elevator-cab and a hoisting-rope therefor, of a stationary upright screw, a socket secured fixedly to the cab, a nut fitted to turn on said screw, an arm carrying said nut and attached to the cab to be capable of an up-and-down movement thereon, a friction-brake one member of which is on said socket and the other on said nut, a horizontal shaft carried by the cab, a lever-arm on said shaft connected with the hoisting-rope, a crank on said shaft, and a rod connecting said crank with the said arm which carries the nut, substantially as described, whereby the nut is prevented from descending on the screw on the breaking of the hoisting-rope, as herein set forth.

In testimony whereof I have signed this specification in the presence of two subscribing witnesses.

PER GUNNAR BACKMAN.

Witnesses:
PAUL GIRALF,
R. J. PRESTON.